(12) United States Patent
Dill

(10) Patent No.: US 11,326,638 B2
(45) Date of Patent: May 10, 2022

(54) THREADED FASTENER WITH A HYBRID SELF-DRILLING TIP

(71) Applicant: Illinois Tool Works Inc., Glenview, IL (US)

(72) Inventor: Michael C. Dill, Elk Grove Village, IL (US)

(73) Assignee: Illinois Tool Works Inc., Glenview, IL (US)

( * ) Notice: Subject to any disclaimer, the term of this patent is extended or adjusted under 35 U.S.C. 154(b) by 115 days.

(21) Appl. No.: 15/709,639

(22) Filed: Sep. 20, 2017

(65) Prior Publication Data

US 2018/0100534 A1 Apr. 12, 2018

Related U.S. Application Data

(60) Provisional application No. 62/405,503, filed on Oct. 7, 2016.

(51) Int. Cl.
*F16B 25/02* (2006.01)
*F16B 25/10* (2006.01)
*F16B 25/00* (2006.01)

(52) U.S. Cl.
CPC ........ *F16B 25/103* (2013.01); *F16B 25/0084* (2013.01); *F16B 25/0031* (2013.01)

(58) Field of Classification Search
CPC . F16B 25/103; F16B 25/0084; B23B 2251/04
USPC ............................ 411/387.1, 387.8; 408/230
See application file for complete search history.

(56) References Cited

U.S. PATENT DOCUMENTS

| 3,093,028 A | * | 6/1963 | Mathie ................ F16B 25/0031 |
| | | | 411/387.4 |
| 3,238,836 A | * | 3/1966 | Johnson .............. F16B 25/0021 |
| | | | 411/387.4 |
| 4,480,952 A | * | 11/1984 | Jeremias ................. B23B 51/00 |
| | | | 408/1 R |

(Continued)

FOREIGN PATENT DOCUMENTS

| EP | 0 125 131 | 11/1984 |
| JP | H10 47324 | 2/1998 |
| JP | 2010 116 949 A | * 5/2010 |

OTHER PUBLICATIONS

International Search Report and Written Opinion for International Application No. PCT/US2017/052877, dated Nov. 30, 2017 (9 pages).

*Primary Examiner* — Flemming Saether
(74) *Attorney, Agent, or Firm* — Neal, Gerber & Eisenberg LLP

(57) ABSTRACT

The present disclosure provides a threaded fastener having a hybrid self-drilling tip or drill tip. The fastener includes a head, a shank connected to and extending from the head, a helical thread formation extending radially outwardly from part of the shank, and a self-drilling tip including a first tapered tip portion and a second tapered tip portion. The first tapered tip portion is connected at a first end to the shank and at a second end to the second tapered tip portion, and the second tapered tip portion terminates in a pointed end. The outer diameters of both tapered portions taper radially inwardly moving in the direction of the pointed end, which renders the fastener suitable for attachment to wood as well as for fastening two metal objects to one another.

15 Claims, 9 Drawing Sheets

(56) References Cited

U.S. PATENT DOCUMENTS

| | | | |
|---|---|---|---|
| 4,568,229 A * | 2/1986 | Hulsey | F16B 25/0021 |
| | | | 408/227 |
| 4,787,792 A * | 11/1988 | Jesson | F16B 25/0084 |
| | | | 408/229 |
| 4,836,730 A * | 6/1989 | Jesson | B21J 13/02 |
| | | | 411/387.6 |
| 5,354,155 A * | 10/1994 | Adams | B23B 51/00 |
| | | | 408/145 |
| 5,403,137 A * | 4/1995 | Grun | B25B 13/48 |
| | | | 29/456 |
| 5,499,896 A * | 3/1996 | Cafarelli | F16B 25/0084 |
| | | | 408/224 |
| 5,928,236 A * | 7/1999 | Augagneur | A61B 17/8605 |
| | | | 411/405 |
| 6,558,097 B2 | 5/2003 | Mallet et al. | |
| 6,923,611 B2 | 8/2005 | Kenny | |
| 7,393,170 B2 * | 7/2008 | Chen | F16B 25/0052 |
| | | | 411/387.1 |
| 9,694,432 B2 * | 7/2017 | Inglis | B23B 51/08 |
| 2002/0127085 A1 * | 9/2002 | Field | F16B 25/0021 |
| | | | 411/387.6 |
| 2019/0063480 A1 * | 2/2019 | Lajewardi | F16B 25/0073 |

* cited by examiner

THREADED FASTENER WITH A HYBRID SELF-DRILLING TIP

PRIORITY

This application claims priority to and the benefit of U.S. Provisional Patent Application Ser. No. 62/405,503, filed Oct. 7, 2016, the entire contents of which are incorporated herein by reference.

BACKGROUND

Threaded fasteners are well known and widely used throughout the world to secure objects to one another, such as to secure an object to a substrate. A threaded fastener typically includes a head, a shank that is connected to and extends from the head and that terminates in a free end, and a helical thread formation formed on at least part of the shank for frictionally engaging the objects into which the fastener is driven. The head typically includes or defines a mechanical engaging structure sized and shaped to be engaged by a tool (such as a screwdriver) that is used to rotate and drive the threaded fastener.

Certain known self-drilling fasteners include a drill tip that defines flutes. Flutes are well-known, and enable the self-drilling fastener to drill its own hole in the objects into which the self-drilling fastener is being driven. These known self-drilling fasteners are durable because they are configured to withstand the friction and heat generated during the self-drilling process.

Various known self-drilling fasteners have certain disadvantages. First, various known self-drilling fasteners are typically not well-suited for attachment to wood since they tend to drill holes in the wood that are too wide to enable proper engagement between the thread formation and the wood. Second, the free end of the shank of a typical known self-drilling fastener is somewhat blunt. In other words, the landing area is large and generally flat rather than pointed. This can make it difficult for a user to start the self-drilling process when attaching two metal objects to one another because the somewhat blunt free end does not "bite" into the metal. This can cause the somewhat blunt free end of the self-drilling fastener to "walk" on the metal surface instead of penetrating, frustrating the user and marring the metal.

Other various known non-self-drilling fasteners have sharply pointed free ends. Since these known non-self-drilling fasteners do not have fluted drill tips, they are well-suited for attachment to wood. Also, their use of a sharply pointed free end eliminates the above-described walking issue caused by a somewhat blunt free end. The sharply pointed free end will "bite" into the object into which the fastener is to be driven, ensuring quick and accurate penetration. However, the lack of a fluted drill tip often proves problematic when attaching two metal objects to one another. When one of these known non-self-drilling fasteners is driven into the first metal object, the sharply pointed free end quickly penetrates the first metal object. The threads then typically immediately engage and bind the fastener, creating a gap between the first and second metal objects and preventing the fastener from penetrating or readily penetrating the second metal object.

Accordingly, there is a need to provide threaded fasteners that solve these problems.

DETAILED DESCRIPTION

Figure 1:
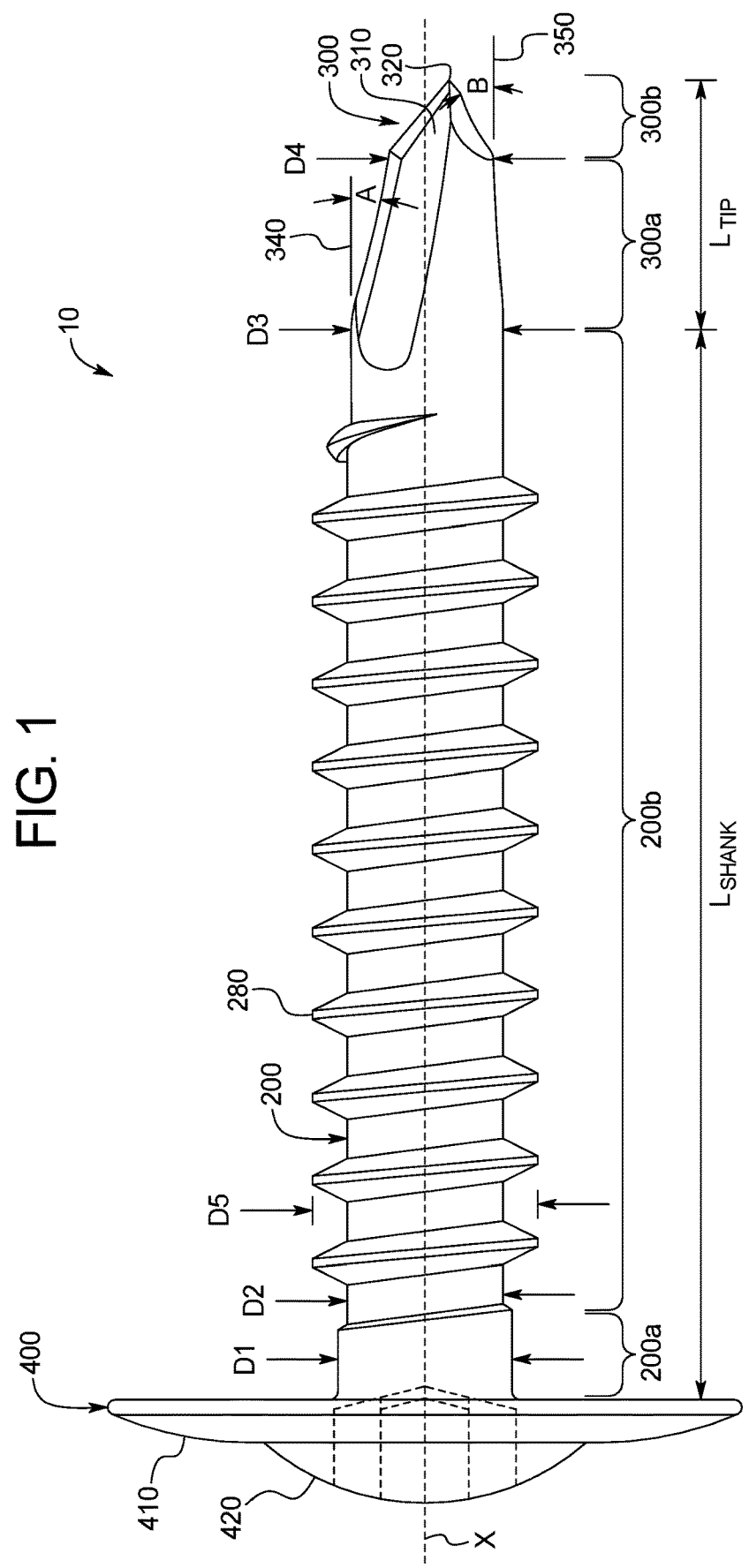
FIG. 1 is a side view of one example embodiment of a threaded fastener of the present disclosure.

Turning now to the drawings, FIGS. 1 to 4 illustrate one example embodiment of the threaded fastener of the present disclosure, generally indicated by numeral 10 and sometimes called the "fastener" herein for brevity. The example fastener 10 is particularly configured for use in fastening metal to metal, metal to wood, and wood to wood. The fastener 10 has a longitudinal axis X and includes a shank 200, a self-drilling tip 300 integrally connected to and extending from one end of the shank 200, and a head 400 integrally connected to and extending from an opposite second end of the shank 200.

The shank 200 has a length $L_{SHANK}$ (or LS) and includes a first shank portion 200a and a second shank portion 200b. The first shank portion 200a has a substantially constant outer diameter D1 and is integrally connected to the head 400 at one end and to the second shank portion 200b at the other end. The second shank portion 200b has a substantially constant outer diameter D2 and is integrally connected to the first shank portion 200a at one end and to the self-drilling tip 300 at the other end. In other embodiments of the present disclosure which are not shown, the shank does not include two portions having different outer diameters, but has a substantially constant diameter throughout its length. In other further embodiments of the present disclosure which are not shown, the shank has an outer diameter that varies in other suitable manners.

The second shank portion 200b has a helical thread formation 280 integrally connected to and extending radially outwardly therefrom. In this illustrated embodiment, the helical thread formation 280 extends along substantially the entire second shank portion 200b, though in other embodiments of the present disclosure, the helical thread formation may extend along less than entire second shank portion 200b. In the illustrated example embodiment of FIGS. 1 to 4, the helical thread formation is a 4.2×1.41 Type "B" Self-Tapping Thread, though any other suitable thread type may be employed in the fastener of the present disclosure.

The helical thread formation 280 has a substantially constant outer diameter D5 or height moving from the head 400 in the direction of the self-drilling tip 300 along the longitudinal axis X. Once reaching a certain point, such as a point 2.82-4.20 millimeters from the self-drilling tip 300 (or 2-3 thread pitches from the self-drilling tip), the outer diameter or height of the helical thread formation begins to decrease until gradually terminating at the outer surface of the shank 200. In other words, once reaching that point, the outer diameter of the helical thread 280 tapers radially inwardly until reaching the outer surface of the shank 200. It should be appreciated that these dimensions and quantities of thread pitches are merely examples, and any suitable dimensions or quantities of thread pitches may be employed in accordance with the present disclosure.

The self-drilling tip 300 has a length $L_{Tip}$ or (LT) and includes a first tapered tip portion 300a and second tapered tip portion 300b. The first tapered tip portion 300a is integrally connected at one end to the second shank portion 200b and at the other end to the second tapered tip portion 300b. The second tapered tip portion 300b terminates in a pointed end 320 that has a very small landing area. At least one and preferably a plurality of flutes 310 are formed in the self-drilling tip 300 along its length (and in this illustrated example embodiment reaching the shank 200), and provide self-drilling functionality as is known in the art. In this example embodiment, the ratio of the length of the self-drilling tip 300 to the length of the shank 200 is about 3:13.

The outer diameter of the first tapered tip portion 300a decreases moving along the longitudinal axis X in the direction of or toward the pointed end 320 from an outer diameter D3 (which in this illustrated embodiment is equal to D2) where connected to the second shank portion 200b to an outer diameter D4 where connected to the second tapered tip portion 300b. In other words, the outer diameter of the first tapered tip portion 300a tapers radially inwardly moving along the longitudinal axis X from the shank 200 toward the second tapered tip portion 300b. As best shown in FIG. 1, the outer surface of the first tapered tip portion 300a forms an angle A with a horizontal line or plane 340 as shown in FIG. 1. In this example embodiment, A is about 5 degrees, though any suitable angle or range of angles may be employed in accordance with the present disclosure.

The outer diameter of the second tapered tip portion 300b tapers radially inwardly from D4 until reaching the pointed end 320. As best shown in FIG. 1, the outer surface of the second tapered tip portion 300b forms an angle B with the horizontal line or plane 350 as shown in FIG. 1. In this example embodiment, B is about 30 to 32.5 degrees, though any suitable angle or range of angles may be employed in accordance with the present disclosure.

It should also be appreciated that the tip 320 can be pointed or can be slightly rounded. In certain embodiments, the tip 320 will be formed pointed and slightly rounded during the finishing manufacturing processes. It should also be appreciated that in certain embodiments the tip 320 will be along the longitudinal axis X, and that in certain embodiments the tip 320 will be slightly offset from the longitudinal axis as shown in FIG. 1.

Figure 2:
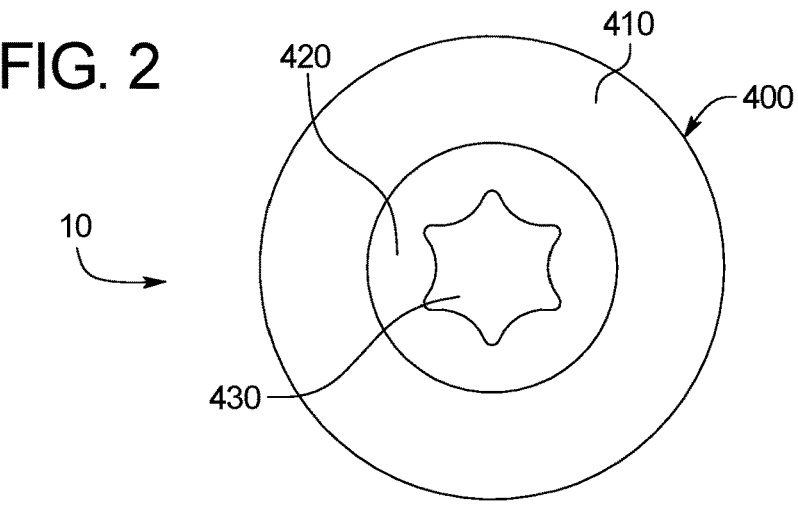
FIG. 2 is a top plan view of the threaded fastener of FIG. 1.
Figure 3:
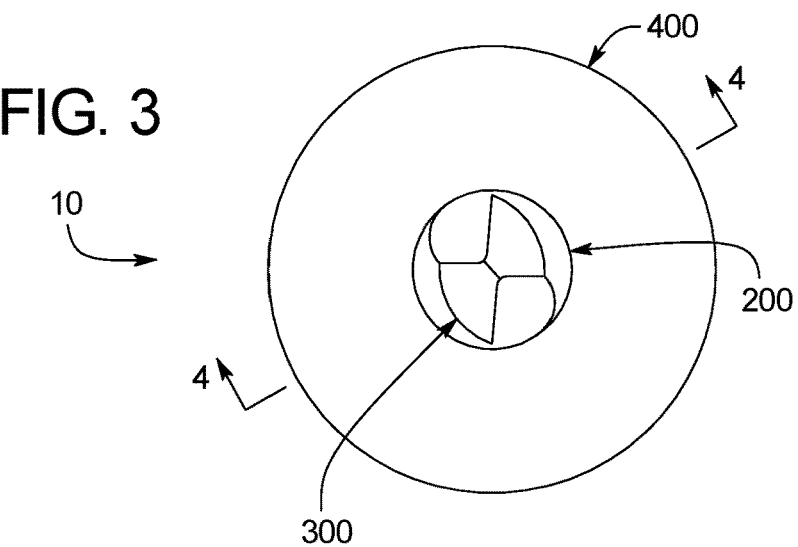
FIG. 3 is a bottom plan view of the threaded fastener of FIG. 1.
Figure 4:
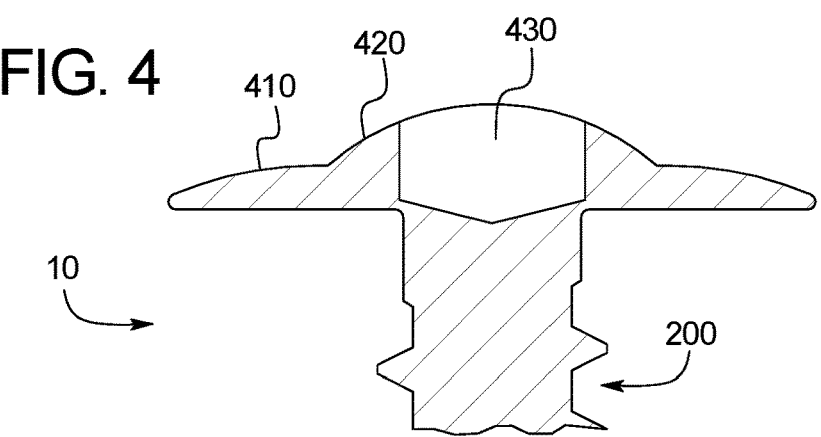
FIG. 4 is a fragmentary cross-sectional side view of part of the threaded fastener of FIG. 1 taken substantially along line 4-4 of FIG. 3.

The head 400 includes a generally annular bottom portion 410 and a rounded top portion 420 integrally connected to the bottom portion 420. The bottom portion 410 is integrally connected to the first shank portion 200a. In this example embodiment, the head 400 defines a mechanical engaging structure 430—a Torx recess as best shown in FIG. 2—that is engageable by an appropriate Torx tool for driving the fastener 10. Any suitable mechanical engaging structure may be employed in accordance with the present disclosure, such as a straight slot (engageable by a flathead screwdriver), a cross-shaped slot (engageable by a Phillips head screwdriver), or an internal or external hexagonal shape (engageable by an Allen wrench or a hex socket).

The fastener of the present disclosure solves the above problems and is particularly suitable for attachment to wood as well as for fastening two metal objects to one another.

More specifically, the geometry of the self-drilling tip ensures that when the fastener is driven into wood it does not drill a hole so wide as to prevent proper engagement between the helical thread formation and the wood. Specifically, unlike conventional self-drilling drill tips, the outer diameter of the first tapered tip portion of the self-drilling tip tapers radially inwardly moving along the longitudinal axis in the direction of the free end of the fastener. This reduces the diameter of the hole drilled by the self-drilling tip of the fastener when driven into an object as compared to a similarly sized fastener with a conventional self-drilling drill tip. This reduced-diameter hole enables better engagement of the helical thread formation with the wood as compared to a similarly sized fastener with a conventional self-drilling drill tip.

The geometry of the self-drilling tip also eliminates the walking issue caused by the somewhat blunt free ends of conventional self-drilling drill tips of threaded fasteners. Specifically, the taper of the second tapered tip portion of the self-drilling tip is more gradual (e.g., forming an angle B of about 35-37.5 degrees) than that of conventional self-drilling drill tips and occurs over a longer length of the second tapered tip portion. This results in a sharper pointed end with a very small landing area that will "bite" into the material into which the fastener is to be driven, ensuring quick and accurate penetration.

Additionally, the flutes and a suitably long $L_{TIP}$ (or LT) ensures proper metal to metal fastening.

FIGS. 5, 6, 7, and 8 illustrate another example embodiment of the fastener of the present disclosure. Like example fastener 10, example fastener 1000 is particularly configured for use in fastening metal to metal, metal to wood, and wood to wood. The fastener 1000 has a longitudinal axis X and includes a shank 1200, a self-drilling tip 1300 integrally connected to and extending from one end of the shank 1200, and a head 1400 integrally connected to and extending from an opposite second end of the shank 1200. The shank portion 1200 has a suitable helical thread formation such as example helical thread formation 1280 integrally connected to and extending radially outwardly therefrom.

The self-drilling tip 1300 has a length $L_{Tip}$ or (LT). The self-drilling tip 1300 includes a first tapered tip portion 1300a and second tapered tip portion 1300b. The first tapered tip portion 1300a is integrally connected at one end to the shank portion 1200 and at the other end to the second tapered tip portion 1300b. The second tapered tip portion 1300b terminates in a pointed end 1320 that has a very small landing area. At least one and preferably a plurality of flutes 1310 are formed in the self-drilling tip 1300 along its length, and provide self-drilling functionality as is known in the art. In this example embodiment, the ratio of the length of the self-drilling tip 1300 to the length of the shank 1200 is about 3:4.

Figure 5:
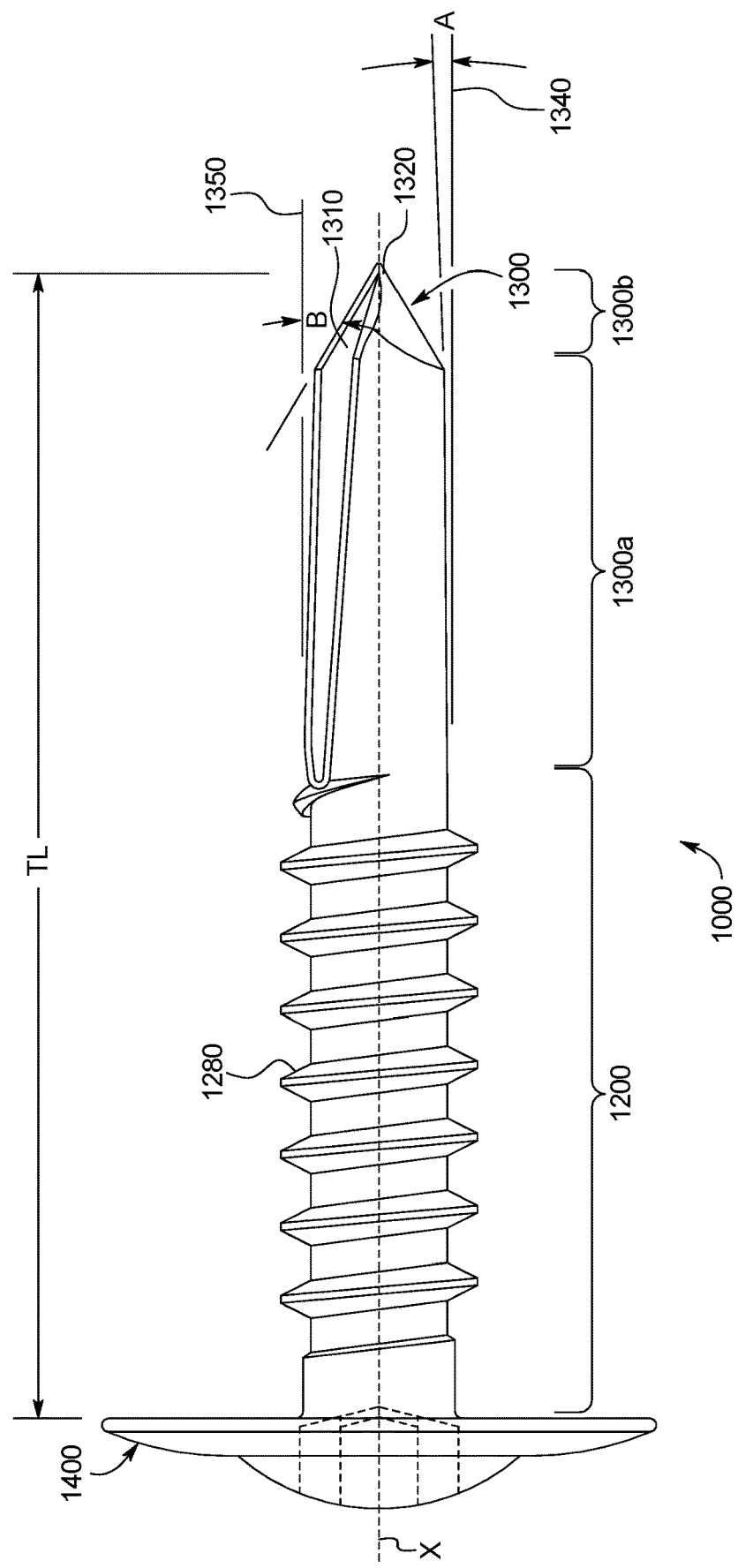
FIG. 5 is a side view of another example embodiment of a threaded fastener of the present disclosure.

The outer diameter of the first tapered tip portion 1300a decreases moving along the longitudinal axis X in the direction of or toward the pointed end 1320 from an outer diameter D3 where connected to the shank portion 1200 to an outer diameter D4 where connected to the second tapered tip portion 1300b. In other words, the outer diameter of the first tapered tip portion 1300*a* tapers radially inwardly moving along the longitudinal axis X from the shank 1200 toward the second tapered tip portion 1300*b*. As best shown in FIG. 5, the outer surface of the first tapered tip portion 1300*a* forms an angle A with a horizontal line or plane 1340 as shown in FIG. 5. In this example embodiment, A is about 5 degrees.

The outer diameter of the second tapered tip portion 1300*b* tapers radially inwardly from D4 until reaching the pointed end 1320. As best shown in FIG. 5, the outer surface of the second tapered tip portion 1300*b* forms an angle B with the horizontal line or plane 1350 as shown in FIG. 5. In this example embodiment, B is about 30 to 32.5 degrees.

It should also be appreciated that the tip 1320 can be pointed or can be slightly rounded. In certain embodiments, the tip 1320 will be formed pointed and slightly rounded during the finishing manufacturing processes. It should also be appreciated that in certain embodiments the tip 1320 will be along the longitudinal axis X as shown in FIG. 5, and that in certain embodiments the tip 1320 will be slightly offset from the longitudinal axis.

Figure 6:
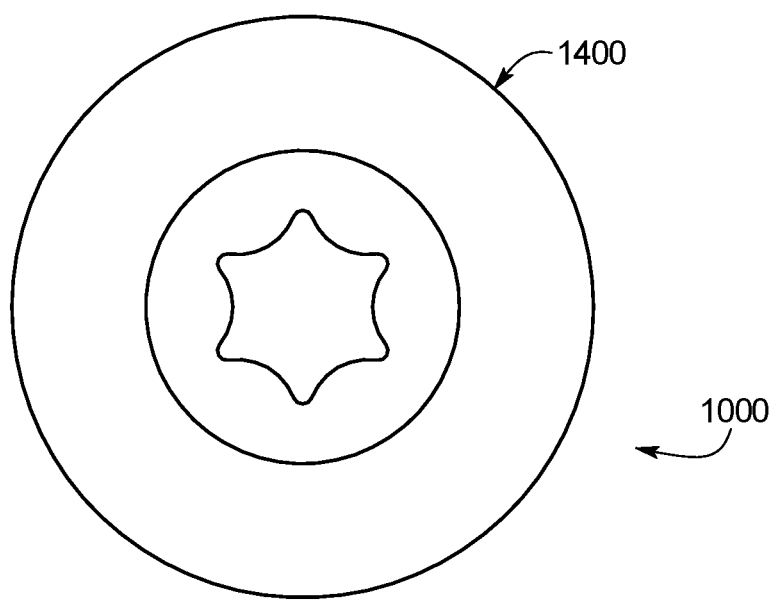
FIG. 6 is a top plan view of the threaded fastener of FIG. 5.
Figure 7:
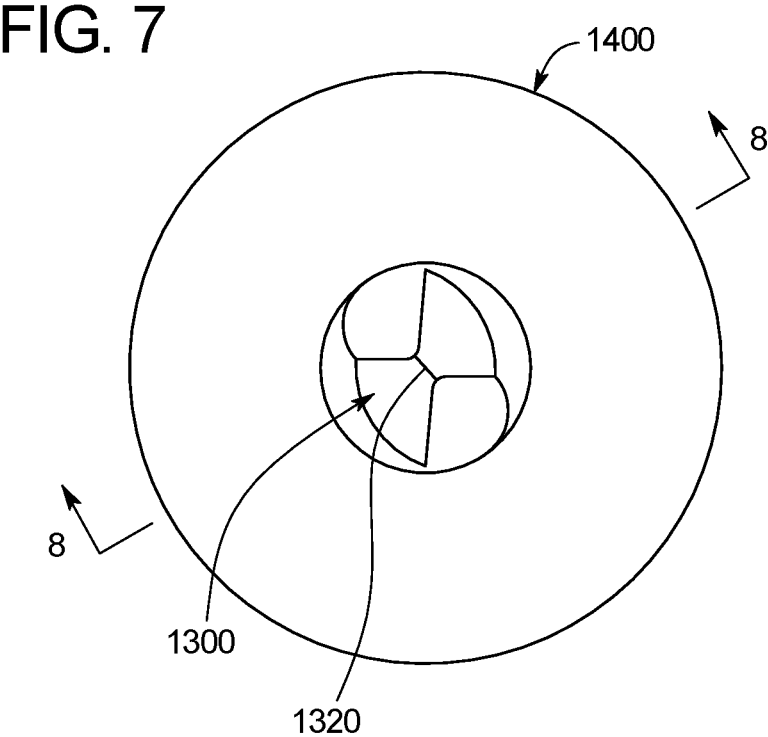
FIG. 7 is a bottom plan view of the threaded fastener of FIG. 5.
Figure 8:
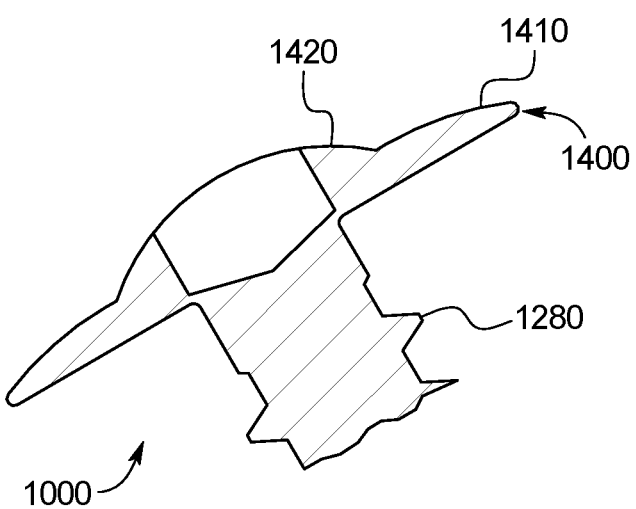
FIG. 8 is a fragmentary cross-sectional side view of part of the threaded fastener of FIG. 5 taken substantially along line 8-8 of FIG. 7.

The head 1400 includes a generally annular bottom portion 1410 and a rounded top portion 1420 integrally connected to the bottom portion 1410. The bottom portion 1410 is integrally connected to the first shank portion 200*a*. In this example embodiment, the head 1400 defines a mechanical engaging structure 1430—a Torx recess as best shown in FIG. 6—that is engageable by an appropriate Torx tool for driving the fastener 1000.

FIGS. 9, 10, 11, and 12 illustrate another example embodiment of the fastener of the present disclosure. Like example fasteners 10 and 1000, example fastener 2000 is particularly configured for use in fastening metal to metal, metal to wood, and wood to wood. The fastener 2000 has a longitudinal axis X and includes a shank 2200, a self-drilling tip 2300 integrally connected to and extending from one end of the shank 2200, and a head 2400 integrally connected to and extending from an opposite second end of the shank 2200. The shank portion 2200 has a suitable helical thread formation such as example helical thread formation 2280 integrally connected to and extending radially outwardly therefrom.

The self-drilling tip 2300 includes a first tapered tip portion 2300*a* and second tapered tip portion 2300*b*. The first tapered tip portion 2300*a* is integrally connected at one end to the shank portion 2200 and at the other end to the second tapered tip portion 2300*b*. The second tapered tip portion 2300*b* terminates in a pointed end 2320 that has a very small landing area. At least one and preferably a plurality of flutes 2310 are formed in the self-drilling tip 2300 along its length, and provide self-drilling functionality as is known in the art. In this example embodiment, the ratio of the length of the self-drilling tip 2300 to the length of the shank 2200 is about 3:4.

The outer diameter of the first tapered tip portion 2300*a* decreases moving along the longitudinal axis X in the direction of or toward the pointed end 2320 from an outer diameter D3 where connected to the shank portion 2200 to an outer diameter D4 where connected to the second tapered tip portion 2300*b*. In other words, the outer diameter of the first tapered tip portion 2300*a* tapers radially inwardly moving along the longitudinal axis X from the shank 2200 toward the second tapered tip portion 2300*b*. The outer surface of the first tapered tip portion 2300*a* forms an angle A with a horizontal line or plane. The outer diameter of the second tapered tip portion 2300*b* tapers radially inwardly from D4 until reaching the pointed end 2320. The outer surface of the second tapered tip portion 2300*b* forms an angle B with the horizontal line or plane. Angles A and B can be any of the angles described above with respect to example fasteners 10 and 1000. Additionally, it should be appreciated that in this example embodiment of the present disclosure, the fastener 2000 includes a slightly curved or smooth transition at the point or area where the first tapered tip portion 2300*a* is connected to the second tapered tip portion 2300*b*.

It should also be appreciated that the tip 2320 can be pointed or can be slightly rounded. In certain embodiments, the tip 2320 will be formed pointed and slightly rounded during the finishing manufacturing processes. It should also be appreciated that in certain embodiments the tip 2320 will be along the longitudinal axis X as shown in FIG. 9, and that in certain embodiments the tip 2320 will be slightly offset from the longitudinal axis.

Figure 10:
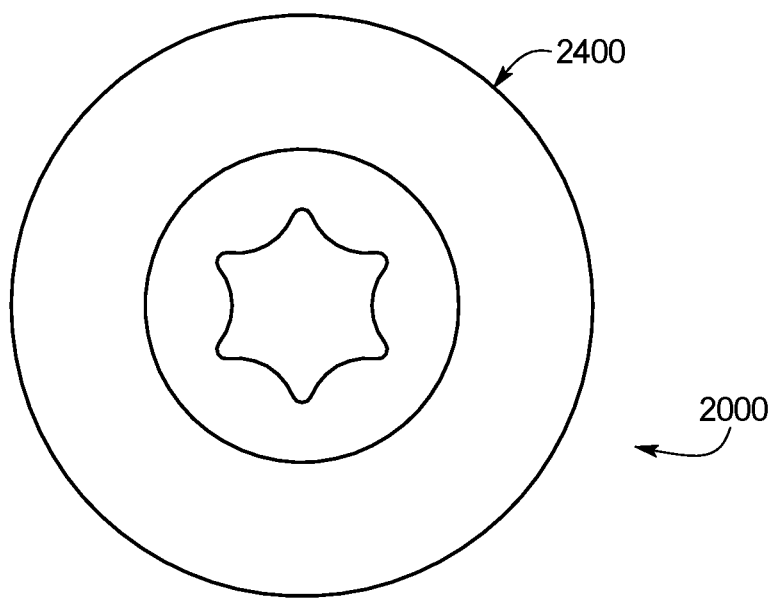
FIG. 10 is a top plan view of the threaded fastener of FIG. 9.
Figure 11:
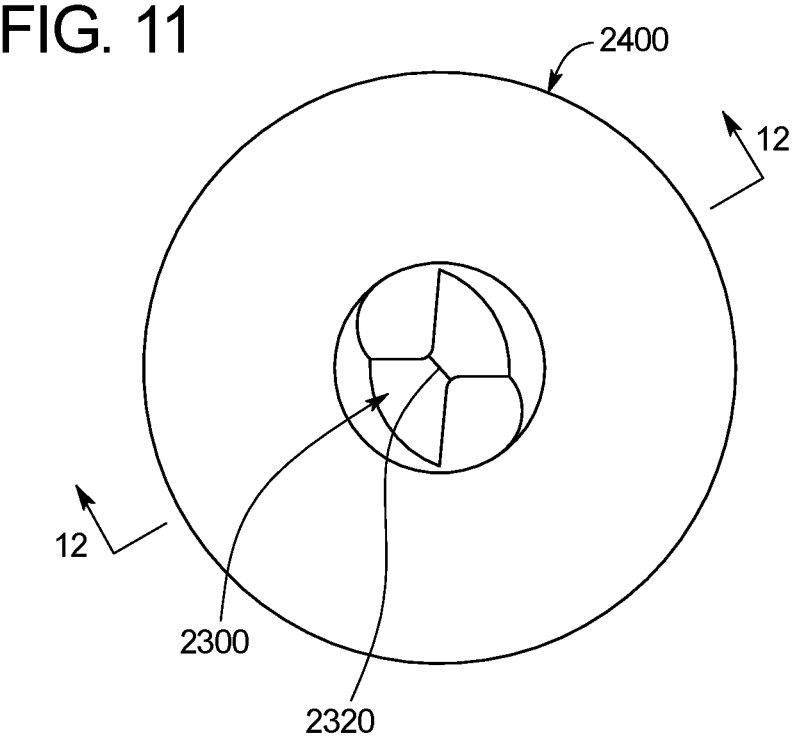
FIG. 11 is a bottom plan view of the threaded fastener of FIG. 9.
Figure 12:
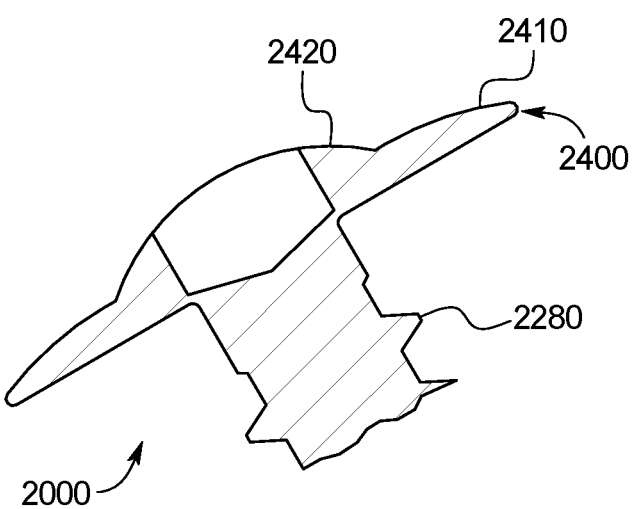
FIG. 12 is a fragmentary cross-sectional side view of part of the threaded fastener of FIG. 9 taken substantially along line 12-12 of FIG. 11.

The head 2400 includes a generally annular bottom portion 2410 and a rounded top portion 2420 integrally connected to the bottom portion 2420. The bottom portion 2410 is integrally connected to the second end of the shank portion 2200. In this example embodiment, the head 2400 defines a mechanical engaging structure 2430—a Torx recess as best shown in FIG. 10—that is engageable by an appropriate Torx tool for driving the fastener 2000.

Figure 9:
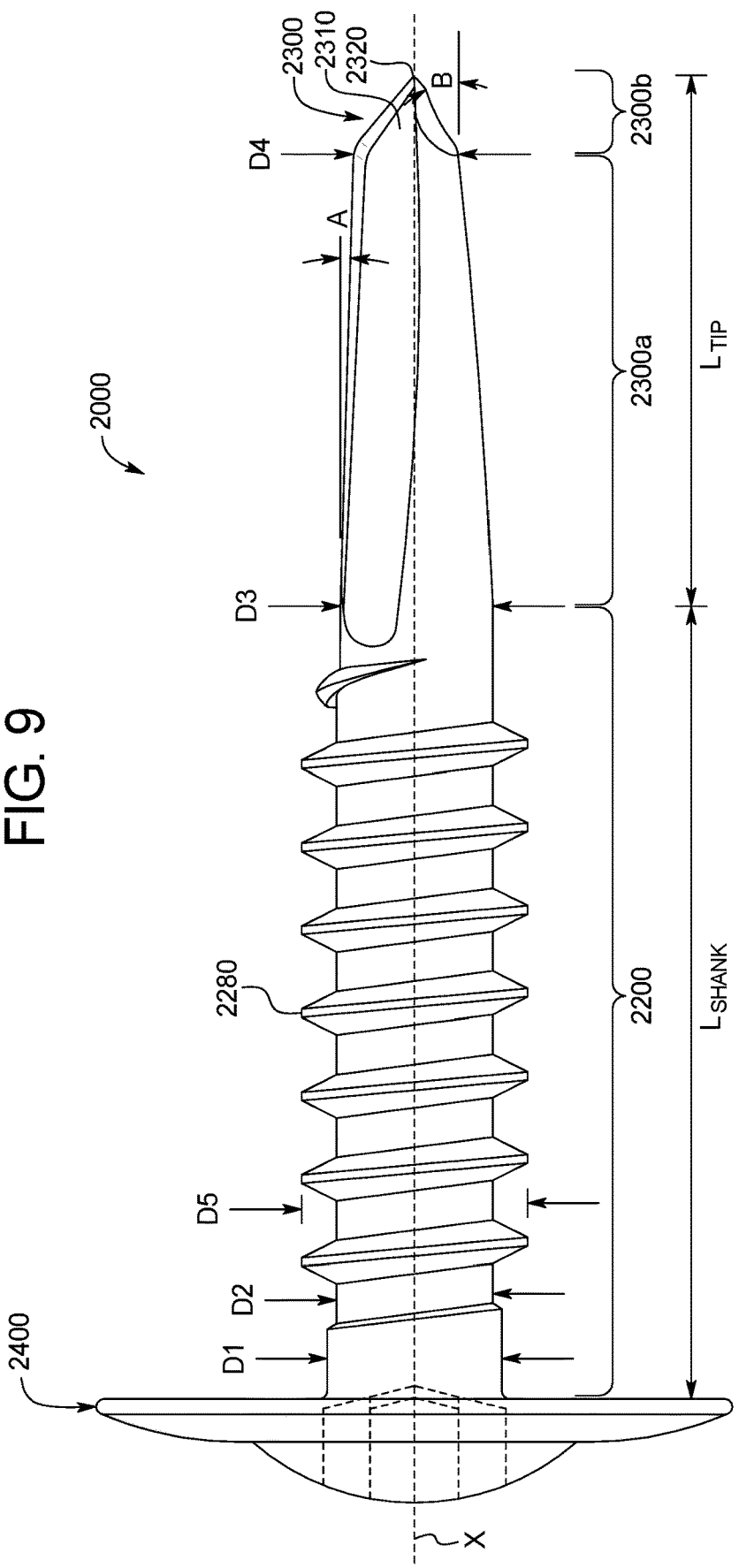
FIG. 9 is a side view of another example embodiment of a threaded fastener of the present disclosure.
Figure 13:
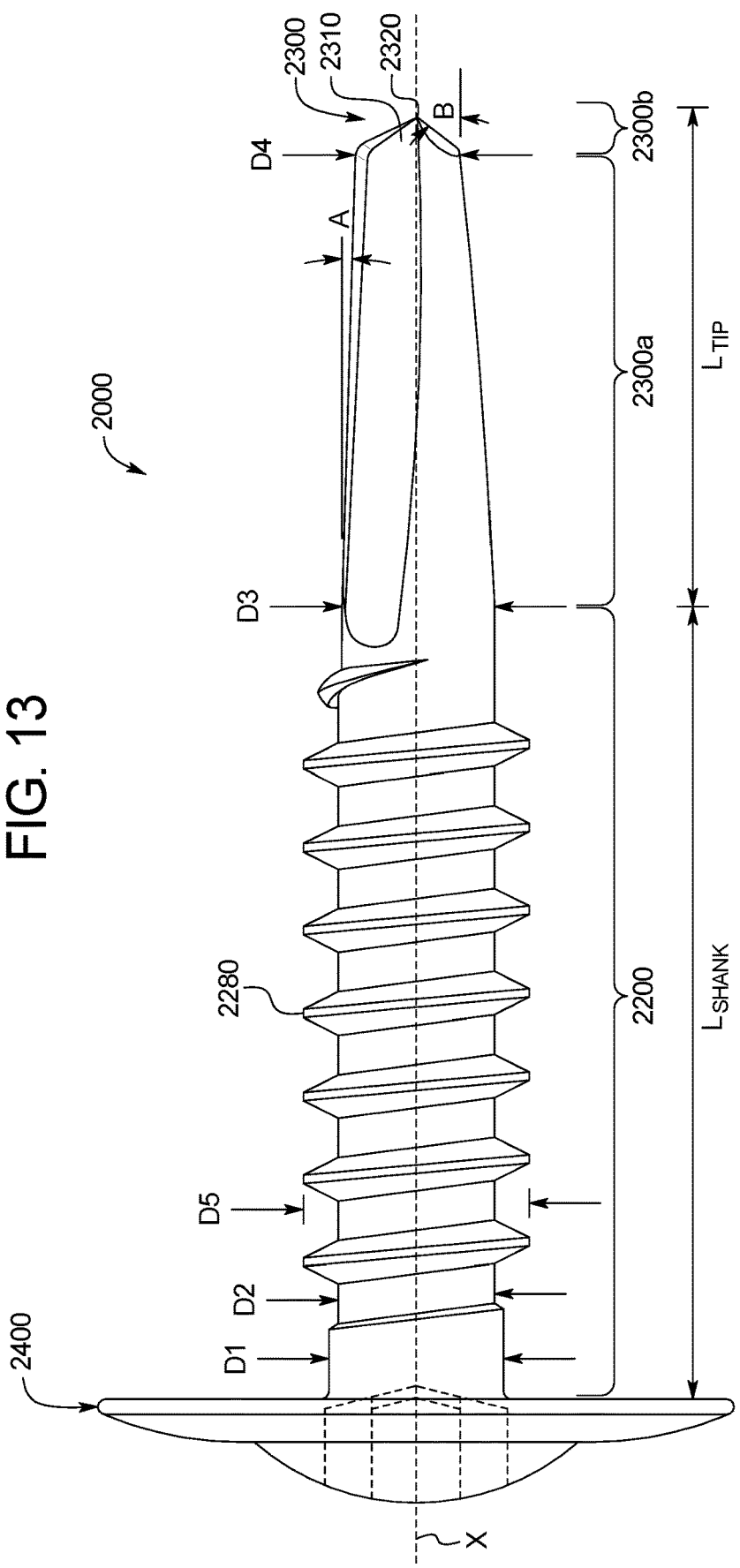
FIG. 13 is a side view of an alternative example embodiment of the threaded fastener of FIG. 9.

FIG. 13 illustrate an alternative example embodiment of the threaded fastener 2000 of FIG. 9. In this example embodiment, the angle B is about 60 to 65 degrees.

It should be appreciated from the above that the present disclosure thus provides a threaded fastener comprising: a head; a shank integrally connected to and extending from the head; a helical thread formation integrally connected to and extending radially outwardly from part of the shank; and a self-drilling tip integrally connected to and extending from the shank, the self-drilling tip including: (a) a first tapered tip portion; and (b) a second tapered tip portion, the first tapered tip portion connected at a first end to the shank and at a second end to the second tapered tip portion, the second tapered tip portion terminating in a pointed end.

In various such embodiments of the threaded fastener, the self-drilling tip includes a plurality of flutes.

In various such embodiments of the threaded fastener, the first tapered tip portion has an outer diameter that decreases moving along a longitudinal axis of the self-drilling tip in a direction toward the pointed end from the first end of the first tapered portion to the second end of the first tapered portion.

In various such embodiments of the threaded fastener, the second tapered tip portion has an outer diameter that decreases moving along the longitudinal axis of the self-drilling tip in a direction toward the pointed end from the first tapered portion to the pointed end.

In various such embodiments of the threaded fastener, the second tapered tip portion has an outer diameter that decreases moving along a longitudinal axis of the self-drilling tip in a direction toward the pointed end from the first tapered portion to the pointed end.

In various such embodiments of the threaded fastener, the outer surface of the first tapered tip portion forms an angle A with a horizontal line extending through the longitudinal axis, wherein A is about 5 degrees.

In various such embodiments of the threaded fastener, the outer surface of the second tapered tip portion forms an angle B with a horizontal line extending through the longitudinal axis, wherein B is about 30 to 32.5 degrees.

In various such embodiments of the threaded fastener, the outer surface of the second tapered tip portion forms an angle B with a horizontal line extending through the longitudinal axis, wherein B is about 35 to 37.5 degrees.

In various such embodiments of the threaded fastener, the outer surface of the second tapered tip portion forms an angle B with a horizontal line extending through the longitudinal axis, wherein B is about 60 to 65 degrees.

It should also be appreciated from the above that the present disclosure thus provides a threaded fastener comprising: a head; a shank integrally connected to and extending from the head; a helical thread formation integrally connected to and extending radially outwardly from part of the shank; and a self-drilling tip integrally connected to and extending from the shank, the self-drilling tip including: (a) a plurality of flutes; (b) a first tapered tip portion; and (c) a second tapered tip portion, the first tapered tip portion connected at a first end to the shank and at a second end to the second tapered tip portion, the second tapered tip portion terminating in a pointed end, wherein the outer surface of the first tapered tip portion forms an angle A with a horizontal line extending through the longitudinal axis, wherein A is about 5 degrees, and wherein the outer surface of the second tapered tip portion forms an angle B with a horizontal line extending through the longitudinal axis, wherein B is about 30 to 32.5 degrees.

It should also be appreciated from the above that the present disclosure thus provides a threaded fastener comprising: a head; a shank integrally connected to and extending from the head; a helical thread formation integrally connected to and extending radially outwardly from part of the shank; and a self-drilling tip integrally connected to and extending from the shank, the self-drilling tip including: (a) a plurality of flutes; (b) a first tapered tip portion; and (c) a second tapered tip portion, the first tapered tip portion connected at a first end to the shank and at a second end to the second tapered tip portion, the second tapered tip portion terminating in a pointed end, wherein the outer surface of the first tapered tip portion forms an angle A with a horizontal line extending through the longitudinal axis, wherein A is about 5 degrees, and wherein the outer surface of the second tapered tip portion forms an angle B with a horizontal line extending through the longitudinal axis, wherein B is about 60 to 65 degrees.

It will be understood that modifications and variations may be effected without departing from the scope of the novel concepts of the present invention, and it is understood that this application is to be limited only by the scope of the claims.

The invention is claimed as follows:

1. A threaded fastener comprising:
    a head;
    a shank integrally connected to and extending from the head, the shank having a substantially constant outer surface diameter;
    a helical thread formation integrally connected to and extending radially outwardly from part of the shank; and
    a self-drilling tip integrally connected to and extending from the shank, the self-drilling tip including: (a) a first inwardly tapered tip portion directly connected to the shank; and (b) a second inwardly tapered tip portion directly connected to the first inwardly tapered tip portion, the first inwardly tapered tip portion having a linearly extending outer surface, the outer surface of the first inwardly tapered tip portion directly connected at a first end to the shank and at a second end to the second inwardly tapered tip portion and having a decreasing outer surface circumference from said first end to said second end, the second inwardly tapered tip portion terminating in a pointed end,
    wherein a ratio of a length of the self-drilling tip to a length of the shank is about 3:4,
    wherein a portion of the self-drilling tip that transitions from the first inwardly tapered tip portion to the second inwardly tapered tip portion is convex,
    wherein the self-drilling tip and the helical thread formation are respectively configured to drill and thread in a same rotational direction,
    wherein a portion of the outer surface of the first inwardly tapered tip portion forms an angle A with a first horizontal line parallel to a longitudinal axis of the self-drilling tip,
    wherein A is about 5 degrees,
    wherein the helical thread formation terminates at the first end, and the portion of the outer surface of the first inwardly tapered tip portion linearly extends from the first end to the second end,
    wherein a size of each cross-section of the second inwardly tapered tip portion that is perpendicular to the longitudinal axis continuously decreases starting from the second end to the pointed end, and
    wherein a cross-section of the self-drilling tip that is perpendicular to the longitudinal axis is defined by at least one convex boundary.

2. The threaded fastener of claim 1, wherein the self-drilling tip includes a plurality of flutes.

3. The threaded fastener of claim 1, wherein the first inwardly tapered tip portion has an outer diameter that decreases moving along the longitudinal axis in a direction toward the pointed end from the first end of the first inwardly tapered portion to the second end of the first inwardly tapered portion.

4. The threaded fastener of claim 3, wherein the second inwardly tapered tip portion has an outer diameter that decreases moving along the longitudinal axis in a direction toward the pointed end from the first inwardly tapered portion to the pointed end.

5. The threaded fastener of claim 3, wherein a portion of the outer surface of the second inwardly tapered tip portion forms an angle B with a second horizontal line parallel to the longitudinal axis, wherein B is about 30 to 32.5 degrees.

6. The threaded fastener of claim 3, wherein a portion of the outer surface of the second inwardly tapered tip portion forms an angle B with a second horizontal line parallel to the longitudinal axis, wherein B is about 35 to 37.5 degrees.

7. The threaded fastener of claim 3, wherein a portion of the outer surface of the second inwardly tapered tip portion forms an angle B with a second horizontal line parallel to the longitudinal axis, wherein B is about 60 to 65 degrees.

8. The threaded fastener of claim 1, wherein the second inwardly tapered tip portion has an outer diameter that decreases moving along the longitudinal axis in a direction toward the pointed end from the first inwardly tapered portion to the pointed end.

9. The threaded fastener of claim 1, wherein a portion of the outer surface of the second inwardly tapered tip portion forms an angle B with a second horizontal line parallel to the longitudinal axis, wherein B is about 30 to 32.5 degrees.

10. The threaded fastener of claim 1, wherein a portion of the outer surface of the second inwardly tapered tip portion forms an angle B with a second horizontal line parallel to the longitudinal axis, wherein B is about 35 to 37.5 degrees.

11. The threaded fastener of claim 1, wherein a portion of the outer surface of the second inwardly tapered tip portion forms an angle B with a second horizontal line parallel to the longitudinal axis, wherein B is about 60 to 65 degrees.

12. The threaded fastener of claim 1, wherein the pointed end is offset from the longitudinal axis of the self-drilling tip.

13. The threaded fastener of claim 1, wherein the pointed end is defined by a convex surface.

14. A threaded fastener comprising:
   a head;
   a shank integrally connected to and extending from the head, the shank having a substantially constant outer surface diameter;
   a helical thread formation integrally connected to and extending radially outwardly from part of the shank; and
   a self-drilling tip integrally connected to and extending from the shank, the self-drilling tip including: (a) a plurality of flutes; (b) a first inwardly tapered tip portion directly connected to the shank; and (c) a second inwardly tapered tip portion directly connected to the first inwardly tapered tip portion, the first inwardly tapered tip portion having a linearly extending outer surface, the outer surface of the first inwardly tapered portion directly connected at a first end to the shank and at a second end to the second inwardly tapered tip portion and having a decreasing outer surface circumference from said first end to said second end, the second inwardly tapered tip portion terminating in a pointed end,
   wherein a ratio of a length of the self-drilling tip to a length of the shank is about 3:4,
   wherein a portion of the self-drilling tip that transitions from the first inwardly tapered tip portion to the second inwardly tapered tip portion is convex,
   wherein the self-drilling tip and the helical thread formation are respectively configured to drill and thread in a same rotational direction,
   wherein a portion of the outer surface of the first inwardly tapered tip portion forms an angle A with a first horizontal line parallel to a longitudinal axis of the self-drilling tip,
   wherein A is about 5 degrees,
   wherein the helical thread formation terminates at the first end, and the portion of the outer surface of the first inwardly tapered tip portion linearly extends from the first end to the second end,
   wherein a portion of the outer surface of the second inwardly tapered tip portion forms an angle B with a second horizontal line parallel to the longitudinal axis, wherein B is about 30 to 32.5 degrees,
   wherein a size of each cross-section of the second inwardly tapered tip portion that is perpendicular to the longitudinal axis continuously decreases starting from the second end to the pointed end, and
   wherein a cross-section of the self-drilling tip that is perpendicular to the longitudinal axis is defined by at least one convex boundary.

15. A threaded fastener comprising:
   a head;
   a shank integrally connected to and extending from the head, the shank having a substantially constant outer surface diameter;
   a helical thread formation integrally connected to and extending radially outwardly from part of the shank; and
   a self-drilling tip integrally connected to and extending from the shank, the self-drilling tip including: (a) a plurality of flutes; (b) a first inwardly tapered tip portion directly connected to the shank; and (c) a second inwardly tapered tip portion directly connected to the first inwardly tapered tip portion, the first inwardly tapered tip portion having a linearly extending outer surface, the outer surface of the first inwardly tapered portion directly connected at a first end to the shank and at a second end to the second inwardly tapered tip portion and having a decreasing outer surface circumference from said first end to said second end, the second inwardly tapered tip portion terminating in a pointed end,
   wherein a ratio of a length of the self-drilling tip to a length of the shank is about 3:4,
   wherein a portion of the self-drilling tip that transitions from the first inwardly tapered tip portion to the second tapered tip portion is convex,
   wherein the self-drilling tip and the helical thread formation are respectively configured to drill and thread in a same rotational direction,
   wherein a portion of the outer surface of the first inwardly tapered tip portion forms an angle A with a horizontal line extending through a longitudinal axis of the self-drilling tip,
   wherein A is about 5 degrees,
   wherein the helical thread formation terminates at the first end, and the portion of the outer surface of the first inwardly tapered tip portion linearly extends from the first end to the second end,
   wherein a portion of the outer surface of the second inwardly tapered tip portion forms an angle B with a horizontal line extending through the longitudinal axis,
   wherein B is about 60 to 65 degrees,
   wherein a size of each cross-section of the second inwardly tapered tip portion that is perpendicular to the longitudinal axis continuously decreases starting from the second end to the pointed end, and
   wherein a cross-section of the self-drilling tip that is perpendicular to the longitudinal axis is defined by at least one convex boundary.

* * * * *